United States Patent Office 3,516,012
Patented June 2, 1970

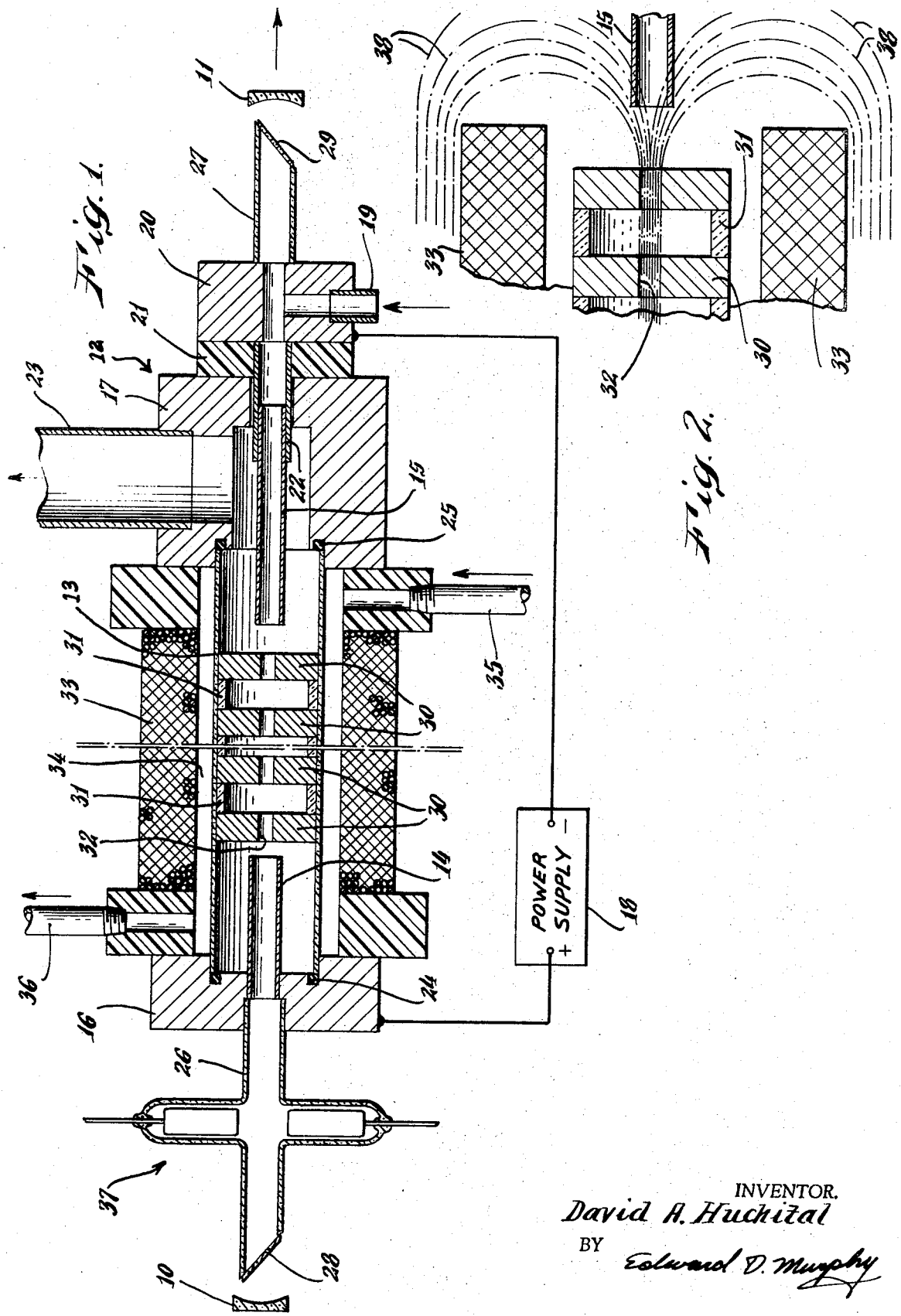

3,516,012
ARGON LASER
David A. Huchital, Norwalk, Conn., assignor to The Perkin-Elmer Corporation, Norwalk, Conn., a corporation of New York
Filed Apr. 22, 1968, Ser. No. 723,073
Int. Cl. H01s 3/09
U.S. Cl. 331—94.5        10 Claims

ABSTRACT OF THE DISCLOSURE

An inert gas laser including an anode and cathode between which a discharge is established. The anode and cathode are hollow and the discharge is coaxial with an optical cavity defined by a pair of mirrors. A flow of inert gas is established through the cathode. The discharge is collimated by a magnetic field and a series of spaced insulated discs having a central aperture. The cathode comprises a low work function material and is preferably positioned outside the region of concentrated magnetic field which collimates the discharge.

---

This invention is directed to inert gas lasers of the type utilizing flowing gas introduced through the cathode to sustain the discharge.

A serious difficulty encountered in inert gas lasers of this type is that of initiating the discharge. In many present lasers, very large overvoltages must be applied and limiting devices must be used to prevent the tube current from reaching excessive levels. To assure establishment of the discharge, furthermore, high voltage must be sustained for at least several seconds. Thus, the power supply must be very large and the laser and its associated apparatus must be capable of dissipating high power levels. This greatly increases the cost, complexity, size and weight over that which is actually required to operate the laser. It is highly desirable to reduce these factors as much as possible.

Another difficulty is that large power inputs to the cathode have been required to maintain the discharge. As a result, cathode lifetimes have been limited. Also, this power is dissipated in the form of radiation which passes through the seals and structural interfaces which are necessarily located close to the cathode. The cooling system structure and flow must therefore be large; even then, the high gradient increases the requirements for, and therefore the cost of, these seals and interfaces.

It is, therefore, an object of this invention to provide an inert gas laser which can be started easily.

A further object of this invention is the provision of an inert gas laser wherein cathode lifetime is increased.

Another object of this invention is the provision of an inert gas laser wherein the energy dissipated from the cathode is low.

It is also an object of this invention to provide an inert gas laser which operates at a lower power input level without decrease in the power output.

Another object of this invention is the provision of an inert gas laser wherein the cathode operates at a reduced temperature.

Another object of this invention is to provide an inert gas laser wherein the total energy input is reduced and wherein the energy dissipated to the surroundings is reduced by substantially the same amount.

Briefly, in accord with one embodiment of this invention, an inert gas laser is provided which includes a resonant optical cavity, an anode and a cathode mounted on the axis of the cavity and means for introducing an inert gas between the anode and cathode through an aperture in the cathode. A discharge is established between the anode and cathode and the plasma is concentrated along the optical axis by means of a magnetic field and a confining structure around the optical axis. The discharge is maintained by an interaction among the ionized gas, the neutral gas and the inner cathode surface. To provide for this interaction, the cathode comprises a refractory material having a low work function, preferably less than about three electron-volts. For example, tungsten impregnated with barium, or a compound thereof, is a suitable cathode material. In further accord with this invention, the end of the apertured cathode which is adjacent the discharge is preferably positioned outside the region of concentrated lines of magnetic force which confine the discharge to a small cross section. In other words, the cathode is positioned in the fringing region of the magnetic field where the lines of force curve back toward or around the source. The preferred cathode is a hollow cylinder having a wall thickness of not less than 0.030 inch.

The novel features believed characteristic of the invention are set forth in the appended claims. The invention itself, together with further objects and advantages thereof may best be understood by reference to the following description taken in connection with the appended drawing in which:

FIG. 1 is a vertical cross-sectional view of an inert gas laser in accord with this invention; and FIG. 2 is an enlarged illustration of a detail of FIG. 1.

In the illustration of FIG. 1, an inert gas laser in accord with this invention is illustrated. As shown, mirrors 10 and 11 define an optical cavity within which is contained the active structure 12 of the laser. In essence, this laser is similar to that described and claimed in the copending application of J. D. Rigden and D. A. Huchital, Ser. No. 656,157, filed July 26, 1967, and assigned to the assignee of this invention. The disclosure of that application, including the detailed description of the operation of this type of laser, is incorporated herein by reference. In general, a discharge is established within the active region and radiation emitted thereby is reflected by the mirrors 10 and 11. Stimulated emission occurs due to this reflection and, by maintaining one mirror such as mirror 11 partially transmissive, a useful beam of substantially coherent radiation is obtained.

In the structure of FIG. 1, the discharge is established within a quartz tube 13 by providing an anode 14 and cathode 15, the anode being supported by an end member 16. The cathode end of the tube is closed by end member 17. The anode and cathode are both hollow to permit passage of the radiant energy therethrough. An inert gas is introduced through an inlet port 19 which communicates through coupling 20 and insulating spacer 21 with the interior of the hollow cathode 15. The cathode may be mounted by press fitting it into a support tube 22 which is supported by spacer 21. Electrical power is provided by connecting the power supply 18 to the cathode 15 and support tube 22 through coupling 20. The anode is connected through end member 16. The system is evacuated and the gas flow is established by means of outlet port 23, which is connected to a suitable vacuum pump system, not shown. The discharge tube 13 is also supported from end members 16 and 17. Hermetic enclosure of the region containing the gas is completed by means of O-ring seals 24 and 25 between the end members 16 and 17 and the discharge tube 13, and by glass tubulations 26 and 27 which are respectively sealed to the end member 16 and the coupling 20. The tubulations 26 and 27 are terminated by transparent windows 28 and 29 which are disposed at a Brewster's angle to provide for loss-free transmission of radiation.

Within the discharge tube, several apertured discs 30 are provided to assist in collimating the discharge. The discs are insulated from one another by means of insulating spacers 31. The apertures 32 within the discs are aligned with the optical axis of the cavity.

A magnetic field to provide for additional collimation of the discharge is produced by a solenoid-type magnet 33 which is disposed around the discharge tube and which is connected to an appropriate source of current, not shown. A permanent magnet might also be used if desired. Finally, the discharge region is cooled by passing water over the quartz tube in a space 34 which is left open between the discharge tube and the interior of the solenoid. Water inlet 35 and outlet 36 provide for continuous water flow. An auxiliary discharge 37 may also be included adjacent either or both windows to prevent loss of transmissivity at the windows 28, 29. This concept is described and claimed in the copending application of J. D. Rigden and D. A. Huchital, Ser. No. 709,627, filed Mar. 1, 1968 and assigned to the assignee of this invention.

In operation, a flow of inert gas, usually argon, is provided through the cathode and a voltage is applied between the anode and the cathode. The gas pressure within the tube is on the order of 0.5 torr; this may be produced by a gas flow of 0.1 to 1.0 atm.-cc./sec. A discharge is initiated by suitable means such as inserting an RF generator in series with the power supply. As soon as the discharge is ignited, ions from the discharge are attracted into the cathode where they impinge against the side wall and produce electron emission. The emitted electrons ionize the gas entering through the cathode and these maintain the discharge after the RF starter has been removed. Emission from the discharge is reflected within the optical cavity, stimulating further emission. Due to the existence of a population inversion among the ionic energy levels, laser action is established.

As noted above, starting inert gas lasers has previously presented severe difficulties. An overvoltage of 200 v. D.C. is required compared to the normal operating level, for previous devices, of 40 volts, and this must be maintained until the discharge becomes self-sustaining. This has previously required a time on the order of several seconds. As a result, a system which will normally operate at a low voltage and current must be constructed to supply the high voltage and protect against high currents even though this capacity is only required for brief periods. The present invention is directed to the provision of an inert gas laser construction which does not require this power for igniting the discharge.

Another problem noted above is that of the high voltage drop in the cathode region and the consequent high operating temperature and heat dissipation of the cathode. It has been difficult to overcome these factors because the mechanism by which emission occurs in the self-sustaining hollow cathode laser is not sufficiently understood. It is known that the cathode operates at too low a temperature for the discharge to be supported by thermionic emission; however, various other kinds of emission may be significantly involved. For example, secondary, photoelectric and field emission may contribute ionizing electrons in addition to those which may be thermionically released.

Regardless of the mechanism by which ignition or operation take place, this invention is directed to the discovery that an inert gas laser including a low work function refractory cathode substantially improves the operating characteristics both of the cathode itself and of the overall system. In fact, the combination of this type of cathode in the flowing gas laser practically eliminates the severe starting conditions of previous lasers; in addition, it has been found to reduce the power input required to the cathode thus eliminating the cathode temperature difficulties previously encountered. Furthermore, the quantity of energy which must be removed by the cooling system is reduced by a large factor. Thus, the cost, weight, size and complexity of the system required to produce a given output are all substantially reduced. Finally, it has been found that a high potential drop in the cathode region is no longer required; therefore erosion is reduced and the cathode lifetime is substantially increased.

Accordingly, a primary feature of this invention is the provision of a cathode comprising an apertured body, preferably a hollow cylinder, of a refractory material which exhibits a low work function, preferably less than about three electron volts. As specific examples, the cathode may comprise tungsten impregnated with a compound of barium; tungsten impregnated with thorium; or other low work function refractory materials such as lanthanum hexaboride or thoriated iridium. The preferred cathode material is a porous tungsten matrix, the pores of which have been impregnated with the selected compound, such as barium aluminate. This invention is directed to a gas laser incorporating the hollow cathode discharge and these cathodes and is, in addition, based on the discovery that several difficulties which would be expected of this combination are completely avoided by the particular nature of the hollow cathode laser. Among the difficulties which would make the laser inoperative or impractical but which are avoided by this invention are electrode break-in (the several hours of controlled heating required to prepare the electrode for use), stripping (the removal of low work function material by the fast ions which occur in a low pressure device) and erosion (the removal of structural material by ions accelerated through a large potential drop).

To illustrate the advantages derived from this feature of the invention, a comparison of some of the operating characteristics with those of previous systems is presented. Prior inert gas lasers have operated at a cathode temperature on the order of 2500° C. or more due to a potential gradient in the cathode region on the order of 40 to 50 volts.

In the combination of the present invention, the cathode operates at a temperature of about 1200° C. and the potential gradient in the cathode region is less than 20 volts. Thus, the energy of ions hitting the cathode after acceleration through all or part of this gradient is substantially reduced. Therefore, erosion of the cathode, caused by ion bombardment, is substantially less and the lifetime of the cathode is substantially increased over that of previous lasers. In addition, the heat radiated by the cathode into the surrounding structure is reduced from 400 watts or more to less than 100 watts. This is of significance in that seals, etc. are subjected to a much lower energy flow and gradient.

An additional advantage is that the total power applied is reduced; in the case of a 10 cm. laser producing 0.4 watt, the power needed is reduced from 1050 watts to 750 watts. The total cooling capacity required is similarly reduced.

A primary advantage is that the laser of the present invention is much easier to start than previous devices. A small over-voltage on the order of 50 volts is applied and the current increases to a value only moderately in excess of the operating value. Almost immediately, the overvoltage can be removed and the discharge is self-sustaining. Thus the equipment needed to supply a large overvoltage and protect against excessive currents and to dissipate this energy for a long period of time is eliminated and the system can be much more inexpensively designed.

In order to obtain the full advantages of this invention, it has also been determined that the cathode cylinder wall should be substantially thicker than that previously used in hollow cathode discharges. Previous cathodes generally have used a wall thickness of about 0.010″. In the laser of this invention the wall thickness should be in the range of 0.030″ or more and preferably about 0.090″. The upper limit of this range is not critical; as a matter of manufacturing convenience, 0.100″ is an approximate upper boundary. However, above 0.030″, the cathode lifetime is significantly greater than for the conventional cathode size.

Further significant improvements in the operating characteristics of the inert gas laser can be obtained by using another feature of this invention, namely, that of cathode position. In accord with this feature, it has been found that the cathode temperature can be reduced still further, with accompanying improvements in the operating characteristics of the system, by positioning the cathode so that it is in the fringe region of the magnetic field, and not in the highly concentrated central region. It has been further determined that this can be accomplished without significantly affecting either the discharge or the output beam. For example, movement of the cathode from the conventional position in the concentrated region of magnetic flux to the fringe region can reduce the cathode temperature by as much as 100° C.

FIG. 2 illustrates only the particular elements of FIG. 1 which are required for an explanation of this effect. The cathode cylinder 15 is shown in the preferred location relative to the lines of force 37 of the magnetic field generated by the magnet 33 which surrounds the laser to collimate the discharge. Specifically, the tip of the cathode cylinder should preferably be positioned so that approximately 40% to 50% of the magnetic lines of force link the cathode orifice. The cathode position defined by this invention may vary within a range determined by the factors affecting cathode emission. If the magnetic field at the cathode is too large, excessive ion bombardment causes over-heating; if it is too small, the voltage drop in the cathode region increases and the higher energy ions cause rapid erosion. In accord with this invention, it has been determined that the cathode temperature can be minimized without causing rapid erosion by placing its orifice in a magnetic field which is not less than 25% nor more than 65%, and preferably between 40% and 50% of the field in the region of maximum intensity. The specific location defined by this condition is affected by the parameters of the particular laser such as the strength and shape of the magnetic field and the magnet, the size of the cathode, the disc aperture, etc. Accordingly, this invention is defined in terms of the concept actually of significance, namely, that of positioning the cathode outside the main concentration of magnetic lines of force so as to avoid excessive heating. So positioning the cathode can increase cathode lifetime by an order of magnitude. This, of course, is in addition to the improvement in these characteristics which may be obtained by means of a low work function cathode as previously described.

While a particular embodiment of this invention has been illustrated and described, it will be understood that various modifications may be made therein without departing from the spirit of the invention and the scope of the appended claims.

I claim:
1. In a gas laser, the combination comprising a resonant optical cavity, means for enclosing a gas within said cavity, electrode means including an anode and a cathode for establishing a primary discharge within said gas to produce stimulation of radiation, means for providing a flow of said gas through an aperture in said cathode so that said discharge is maintained by an interaction between ionized and neutral particles of said gas and the inner surface of said aperture, said cathode comprising a low work function refractory material, and means for permitting transmission of said radiation from said cavity.

2. The combination claimed in claim 1 wherein said cathode comprises a porous matrix of tungsten impregnated with a compound including barium.

3. The combination claimed in claim 1 wherein said cathode comprises a refractory material having a work function of less than about three electron-volts.

4. The combination claimed in claim 1 wherein said cathode comprises a hollow cylinder and wherein the wall thickness of said cylinder is not less than 0.030 inch.

5. The combination claimed in claim 4 and further including means for providing a magnetic field coaxial with said optical cavity, and means for mounting said cathode into the fringe field region of said magnetic field, said cathode being positioned so that said aperture intercepts not more than 65% nor less than 25% of the maximum value of said magnetic field along said optical axis.

6. The combination claimed in claim 4 wherein the wall thickness of said cylinder is approximately 0.090 inch.

7. The combination claimed in claim 1 and further including means for providing a magnetic field coaxial with said optical cavity, and means for mounting said cathode into the fringe field region of said magnetic field, said cathode being positioned so that said aperture intercepts not more than 65% nor less than 25% of the maximum value of said magnetic field along said optical axis.

8. The combination claimed in claim 7 wherein said aperture is positioned to intercept from 40% to 50% of the maximum value of said magnetic field.

9. The combination claimed in claim 8 wherein said cathode comprises a hollow cylinder having a wall thickness on the order of 0.090 inch and wherein the work function of said cathode is less than about three electron-volts.

10. In a gas laser of the type including a resonant optical cavity, means for enclosing a gas within said cavity, electrode means including an anode and a cathode for establishing a primary discharge within said gas to produce stimulation of radiation, an aperture in said cathode, means for providing a flow of said gas through said aperture so that said discharge is maintained by an interaction between ionized and neutral particles of said gas and the inner surface of said aperture, and means for permitting transmission of said radiation from said cavity, the improvement comprising providing said cathode as a substantially cylindrical member formed of a low work function refractory material.

References Cited
UNITED STATES PATENTS 3,424,997   1/1969   Lopez et al.

RONALD L. WIBERT, Primary Examiner
J. ROTHENBERG, Assistant Examiner